US010336640B2

(12) United States Patent
Demott et al.

(10) Patent No.: US 10,336,640 B2
(45) Date of Patent: Jul. 2, 2019

(54) METHOD AND APPARATUS FOR MELTING SOLID RAW BATCH MATERIAL USING SUBMERGED COMBUSTION BURNERS (71) Applicant: KNAUF INSULATION, Visé (BE)

(72) Inventors: Gerard Demott, Majcichov (SK); Bostjan Marolt, Poljane (SI); Randy Etzkorn, Visé (BE); David Ducarme, Wavre (BE)

(*) Notice: Subject to any disclaimer, the term of this patent is extended or adjusted under 35 U.S.C. 154(b) by 108 days.

(21) Appl. No.: 14/908,767

(22) PCT Filed: Jul. 30, 2014

(86) PCT No.: PCT/EP2014/066444
§ 371 (c)(1),
(2) Date: Jan. 29, 2016

(87) PCT Pub. No.: WO2015/014921
PCT Pub. Date: Feb. 5, 2015

(65) Prior Publication Data
US 2016/0185642 A1 Jun. 30, 2016

(30) Foreign Application Priority Data
Jul. 31, 2013 (GB) .................................. 1313651.0

(51) Int. Cl.
C03B 5/235 (2006.01)
C03B 5/183 (2006.01)
(Continued)

(52) U.S. Cl.
CPC ............ C03B 5/183 (2013.01); C03B 5/2356 (2013.01); C03B 5/44 (2013.01); F23C 3/004 (2013.01);
(Continued)

(58) Field of Classification Search
CPC .................................................. C03B 5/2356
See application file for complete search history.

(56) References Cited

U.S. PATENT DOCUMENTS 3,248,205 A   4/1966   Dolf et al.
3,260,587 A   7/1966   Dolf et al.
(Continued)

FOREIGN PATENT DOCUMENTS

DE   10029983 A1   1/2002
EP    0086858 A1   8/1983
(Continued)

OTHER PUBLICATIONS

"Energy-efficient glass melting—The next generation melter— Final Report" (82 pages), David Rue, US Gas Technology Institute Project 20621, pp. 26-30, Figures 23-41 and pp. 1-73, Figures 23, 25, 61, 68, and 70 Mar. 1, 2008.
(Continued)

Primary Examiner — Cynthia Szewczyk
(74) Attorney, Agent, or Firm — Knauf Insulation, Inc.; James K. Blodgett (57) ABSTRACT The present invention relates to a process for melting solid batch material, comprising the steps of introducing solid batch material into a melter, and melting the solid batch material in the melter by submerged combustion and subjecting the melt to a flow pattern which when simulated on a computer by making use of common fluid dynamic equations shows a substantially toroidal melt flow pattern in the melt, comprising a major centrally inwardly convergent flow at the melt surface, the central axis of revolution of the toroid being substantially vertical. The invention further relates to a melter assembly for carrying out the process. The toroidal
(Continued)

melt flow pattern is achieved by suitable arrangement, angle and spacing of multiple submerged combustion burners in the floor of the melter.

29 Claims, 3 Drawing Sheets

(51) Int. Cl.
    *C03B 5/44*           (2006.01)
    *F23C 3/00*          (2006.01)
    *C03B 5/12*          (2006.01)

(52) U.S. Cl.
    CPC ............ *C03B 5/12* (2013.01); *C03B 2211/22* (2013.01); *C03B 2211/60* (2013.01); *C03B 2211/70* (2013.01)

(56) References Cited

U.S. PATENT DOCUMENTS

| | | | |
|---|---|---|---|
| 3,592,151 | A | 7/1971 | Webber |
| 4,422,862 | A | 12/1983 | Wardlaw |
| 4,544,394 | A * | 10/1985 | Hnat ........................ C03B 5/12 65/134.1 |
| 4,622,007 | A | 11/1986 | Gitman |
| 4,632,687 | A | 12/1986 | Kunkle et al. |
| 5,062,789 | A | 11/1991 | Gitman |
| 5,100,453 | A | 3/1992 | Richards |
| 5,104,310 | A | 4/1992 | Saltin |
| 5,728,190 | A | 3/1998 | Pieper et al. |
| 5,770,535 | A | 6/1998 | Brix et al. |
| 5,954,498 | A | 9/1999 | Joshi et al. |
| 6,109,062 | A | 8/2000 | Richards |
| 6,460,376 | B1 | 10/2002 | Jeanvoine et al. |
| 7,273,583 | B2 * | 9/2007 | Rue ........................ C03B 5/2356 266/242 |
| 8,899,224 | B2 | 12/2014 | Cowles |
| 9,150,446 | B2 | 10/2015 | Douxchamps et al. |
| 9,533,905 | B2 | 1/2017 | Charbonneau et al. |
| 9,643,871 | B2 | 5/2017 | Cowles et al. |
| 2002/0000100 | A1 | 1/2002 | Burg et al. |
| 2002/0162358 | A1 | 11/2002 | Jeanvoine et al. |
| 2005/0039491 | A1 | 2/2005 | Maugendre et al. |
| 2005/0236747 | A1 | 10/2005 | Rue et al. |
| 2006/0000239 | A1 | 1/2006 | Jeanvoine et al. |
| 2006/0105899 | A1 | 5/2006 | Jacques et al. |
| 2008/0145804 | A1 | 6/2008 | Palmieri et al. |
| 2008/0184919 | A1 | 8/2008 | D'Agostini et al. |
| 2008/0256981 | A1 | 10/2008 | Jacques et al. |
| 2008/0276652 | A1 | 11/2008 | Bauer et al. |
| 2009/0176639 | A1 | 7/2009 | Jacques et al. |
| 2011/0236846 | A1 * | 9/2011 | Rue ........................ F27B 3/205 432/195 |
| 2011/0308280 | A1 | 12/2011 | Huber |
| 2012/0077135 | A1 | 3/2012 | Charbonneau |
| 2013/0086944 | A1 | 4/2013 | Shock et al. |
| 2013/0086949 | A1 | 4/2013 | Charbonneau |
| 2013/0086950 | A1 | 4/2013 | Huber et al. |
| 2013/0086951 | A1 | 4/2013 | Charbonneau et al. |
| 2013/0086952 | A1 | 4/2013 | Charbonneau et al. |
| 2013/0260980 | A1 | 10/2013 | Touslee et al. |
| 2013/0283861 | A1 | 10/2013 | Mobley et al. |
| 2013/0327092 | A1 | 12/2013 | Charbonneau |
| 2014/0007622 | A1 | 1/2014 | Shock et al. |
| 2014/0007623 | A1 | 1/2014 | Charbonneau et al. |
| 2014/0090423 | A1 | 4/2014 | Charbonneau et al. |
| 2014/0144185 | A1 | 5/2014 | Shock et al. |
| 2015/0225274 | A1 | 8/2015 | Solvang et al. |
| 2015/0274578 | A1 | 10/2015 | Solvang et al. |
| 2015/0291465 | A1 | 10/2015 | Cowles et al. |
| 2016/0060154 | A1 | 3/2016 | Cowles et al. |
| 2016/0075586 | A1 | 3/2016 | Charbonneau et al. |
| 2016/0083279 | A1 | 3/2016 | Cai et al. |
| 2016/0130168 | A1 | 5/2016 | Cowles et al. |
| 2016/0145135 | A1 | 5/2016 | Baker |
| 2016/0159675 | A1 | 6/2016 | DeMott et al. |
| 2016/0159676 | A1 | 6/2016 | DeMott et al. |
| 2016/0168001 | A1 | 6/2016 | DeMott et al. |
| 2016/0185642 | A1 | 6/2016 | DeMott et al. |
| 2016/0207814 | A1 | 7/2016 | DeMott et al. |

FOREIGN PATENT DOCUMENTS

| | | |
|---|---|---|
| EP | 2578548 A2 | 4/2013 |
| FR | 2837916 A1 | 10/2003 |
| JP | 2012096942 A | 5/2012 |
| WO | 8707591 A1 | 12/1987 |
| WO | 9854101 A1 | 12/1998 |
| WO | 2008084138 A1 | 7/2008 |

OTHER PUBLICATIONS

"Submerged Combustion Melting of Glass" (14 pages, pp. 262-274), David Rue and John T. Brown, International Journal of Applied Glass Science, vol. 2, No. 4, pp. 270-271, Figure 2—Nov. 9, 2011.
"Submerged Combustion Metter" (9 pages), David Rue, Walter Kunc, and Victor A. Nosovitsky, Institute of Gas Technology (Chicago, IL), Vladimir M. Olabin and Alexander B. Maximuk (Gas Institute, Naval Academy of Sciences (Kiev, Ukraine), American Research Conference, Chicago, IL, Sep. 21-22, 1997.
"Energy-efficient glass melting—The next generation melter" (24 pages), David Rue, Gas Technology Institute, DOE Industrial Technology Program, 2005 Project-Industry Review, Sep. 15, 2005.
Office action for co-pending U.S. Appl. No. 14/908,348 (10 pages)—dated Sep. 12, 2017.
Office action for co-pending U.S. Appl. No. 14/908,757 (21 pages)—dated Jan. 23, 2018.
Office action for co-pending U.S. Appl. No. 14/908,757 (20 pages)—dated Aug. 27, 2018.
Notice of Allowance for co-pending U.S. Appl. No. 14/908,360 (10 pages)—dated Oct. 11, 2016.
Notice of Allowance for co-pending U.S. Appl. No. 14/908,360 (9 pages)—dated Sep. 6, 2017.
Notice of Allowance for co-pending U.S. Appl. No. 14/908,357 (8 pages)—dated Feb. 21, 2018.
Written Opinion of International Searching Authority re PCT/EP2014/066440 (7 pages)—dated Nov. 3, 2014.
Written Opinion of International Searching Authority re PCT/EP2014/066441 (7 pages)—dated Nov. 3, 2014.
Written Opinion of International Searching Authority re PCT/EP2014/066442 (5 pages)—dated Nov. 7, 2014.
Written Opinion of International Searching Authority re PCT/EP2014/066443 (7 pages)—dated Nov. 13, 2014.
Written Opinion of International Searching Authority re PCT/EP2014/066444 (6 pages)—dated Nov. 7, 2014.
Office action for co-pending U.S. Appl. No. 14/908,348 (9 pages)—dated Jun. 15, 2018.
Office action for co-pending U.S. Appl. No. 14/908,757 (16 pages)—dated Apr. 17, 2017.
Office action for co-pending U.S. Appl. No. 14/908,360 (15 pages)—dated Mar. 23, 2017.
Office action for co-pending U.S. Appl. No. 14/908,357 (12 pages)—dated Jun. 27, 2017.
Office action for co-pending U.S. Appl. No. 14/908,348 (10 pages)—dated Dec. 13, 2018.
"Deposits and condensation from flue gases in glass furnaces," Beerkens, R.G.C., Eindhoven: Technische, Universiteit Eindhoven DOI: 10.6100/IR25404 (227 pages, 1986).
"Modelling the evaporation of boron species. Part 1. Alkali-free borosilicate glass melts," Van Limpt, H., Beerkens, R., Cook, S., O'Conner, R., Simon, J., Glass Technol.: Eur. J. Glass Sci. Technol. A, Jun. 2011, 52, (3), pp. 77-87.
"Analysis of elementary process steps in industrial glass melting tanks—some ideas on innovations in industrial glass melting," Beerkens, R., paper presented at the seminar "Advanced glass (56) References Cited

OTHER PUBLICATIONS materials and innovative glass melting technology in the year 2020," Brig, Switzerland, Mar. 26-29, 2008, pp. 206-217.

* cited by examiner

METHOD AND APPARATUS FOR MELTING SOLID RAW BATCH MATERIAL USING SUBMERGED COMBUSTION BURNERS

CROSS-REFERENCE TO RELATED APPLICATIONS

This application is a U.S. national counterpart application under 35 U.S.C. § 371 of International Application Serial No. PCT/EP2014/066444, filed Jul. 30, 2014, which claims priority to GB Application Serial No. 1313651.0, filed Jul. 31, 2013, the entire disclosures of which are expressly incorporated by reference herein.

The present invention relates to submerged combustion melters, notably for melting vitreous or vitrifiable material, and to processes using a submerged combustion melter.

Vitreous materials are generally manufactured from a mixture of raw materials, for example silicates, basalt, limestone, soda ash and other minor constituents which are introduced into a melter and melted into a viscous liquid state at temperatures in the order of 1250 to 1500° C.; the melt is then supplied to a forming process. Depending on the intended use of the melt, for example for manufacture of flat glass, hollow glass, continuous fibers for reinforcement purposes or fibers for insulation purposes, a melt refining step may be required upstream of the forming process. The chemical composition of the melt and its physical properties are selected as a function of the intended use and the forming process.

Conventional glass melters comprise an energy supply from above a glass melt surface, for example from burners generating a flame in a space between the glass melt surface and a crown of the melter, whereby heat is transferred to the glass melt by the flame itself and by radiation from the crown material. Raw batch material to be melted is loaded at the top of the glass melt in the melter and heat is transferred from the melt to the batch material which is incorporated into the melt.

In some glass melters, energy is supplied by electrically heated electrodes arranged below the surface of the melt; such electrodes may provide the only heat source or be used in combination with burners.

A further type of glass melter has one or more burner nozzles arranged below the surface of the melt such that the burner flames and/or and combustion products pass through the melt. This arrangement is referred to as submerged combustion.

Glass melters used to manufacture stone wool insulation have traditionally been cupola furnaces.

The present invention now seeks to provide an improved highly efficient process for sintering and/or melting batch materials. Such a process shows reduced energy consumption together with improved melt characteristics, including homogeneity in terms of temperature distribution and composition, leading to improved end product quality. It allows melting of a large variety of materials, notably vitrifiable material and shows a high flexibility in controlling the process parameters.

According to another aspect, the present invention also seeks to provide an improved submerged combustion melter for melting materials, notably vitreous or vitrifiable materials, which shows further enhanced efficiency in heat transmission and melting of raw material.

More specifically, the present invention seeks to improve the absorption of fresh raw material within the melt and the efficiency of transmission of heat to fresh raw material, notably when added at the top of the melt, thus improving the overall homogeneity in terms of temperature profile and composition of the melt. At the same time, any bypass of raw material through the melter is largely avoided or at least reduced, thus leading to an efficient melting of batch material, and hence to smaller melters for a given output flow.

According to one of its aspects, the present invention provides a submerged combustion melter as defined in claim 1. Other independent claims define other aspects of the invention. Dependent claims define preferred and/or alternative embodiments.

One or more aspects described in the following patent applications, which also relate to submerged combustion melting and/or melters, may be used in respect of the inventions of the present patent application and each of the following patent applications is hereby incorporated by reference:

| Application | Name of applicant | Priority claimed | Our ref |
| --- | --- | --- | --- |
| International PCT patent application PCT/EP2014/066440 filed on Jul. 30, 2014 | Knauf Insulation | GB 1313653.6 | P0524/PCT KMRecup |
| International PCT patent application PCT/EP2014/066441 filed on Jul. 30, 2014 | Knauf Insulation | GB 1313656.9 | P0554/PCT KMScrap |
| International PCT patent application PCT/EP2014/066442 filed on Jul. 30, 2014 | Knauf Insulation | GB 1313652.8 | P0523/PCT KMburn |
| International PCT patent application PCT/EP2014/066443 filed on Jul. 30, 2014 | Knauf Insulation | GB 1313654.4 | P0543/PCT KMGeo |

According to one particular aspect, the present invention provides a process for melting material, notably vitrifiable material, comprising the steps of introducing solid batch material into a melter, melting the solid batch material in the melter by submerged combustion and subjecting the melt to a flow pattern which when simulated by means of Computational Fluid Dynamics analysis shows a substantially toroidal melt flow pattern in the melt, the flow pattern comprising major centrally inwardly convergent flow vectors at the melt surface, with the central axis of revolution of the toroid being substantially vertical. Preferably, the melt in the melter comprises a single such toroidal flow pattern.

Close to the vertical axis of revolution of said toroidal flow pattern, the flow vectors change orientation showing a downward component, hence reflecting significant downward movement of the melt in proximity of said axis. At the melter bottom, the flow vectors change orientation showing outwardly and then upwardly orientated components.

Preferably the fluid dynamics model code is ANSYS R14.5, taking into consideration the multi-phase flow field with phases ranging from solid batch material to liquid melt, to various gas species associated with both the combustion of fuel and oxidant by the burners as well as those generated in the course of the batch-to-melt conversion process.

The melt may be withdrawn for further downstream processing, including flat glass or container glass formation, continuous fiber formation or mineral wool fiber production. In the case of mineral wool fiber production, the output is preferably taken directly to fiberization without a refining step.

According to a preferred embodiment, the toroidal melt flow pattern is obtained by functional submerged combustion burners arranged at the melter bottom, in a substantially annular burner zone, imparting a substantially vertically upward directed speed component to the combustion gases. Advantageously, the burners are arranged at a distance between adjacent burners of about 250-1250 mm, advantageously 500-900 mm, preferably about 600-800, even more preferably about 650-750 mm.

The speed vector of the melt moving upwards over or adjacent to the submerged burners may be slightly inclined from the vertical, for example by an angle which is $\geq 1°$, $\geq 2°$, $\geq 3°$ or $\geq 5$ and/or which is $\leq 30°$, preferably $\leq 15°$, more preferably $\leq 10°$, notably towards the center of the melter. Such an arrangement may improve the flow and directs the melt flow away from the outlet opening and towards the center of the melter thus favoring the toroidal flow as above defined. It is preferable that the flames should not hit the melter walls.

According to a preferred embodiment, the burners are arranged on a substantially circular burner line. Alternatively, other burner arrangements may be used to achieve the desired toroidal flow pattern. The melter may comprise many burners and the term "burners" as used herein is understood to mean the functional or operational burners, i.e. the burners that are operated in accordance with the invention.

The simulated flow pattern reflects a centrally inwardly convergent flow at the melt surface followed by a downwardly oriented flow in proximity of the central axis of revolution of the toroid. Said central axis of revolution advantageously corresponds to the vertical axis of symmetry of the melter. By axis of symmetry is meant the central axis of symmetry and, if the melter shows a transversal cross-section which does not have any single defined axis of symmetry, then the axis of symmetry of the circle in which the melter section is inscribed. The downwardly oriented flow is followed by an outwardly oriented flow at the bottom of the melter and a substantially annular upward flow at proximity of the burners, reflecting recirculation of melt toward the burner zone and in an ascending movement back to the melt surface, thus defining a substantially toroidal flow pattern.

The inwardly convergent flow vectors at the melt surface advantageously show a speed of up to about 2 m/s. The downward oriented speed vectors at proximity of the vertical central axis of revolution are of significant length or intensity reflecting the relatively high speed of material flowing downwardly. The downward speed vectors reflect material speed of up to about 2 m/s. The melt and/or the raw materials within the melter, at least at one portion of the melter and notably at the melt surface (particularly inwardly convergent flow vectors at the melt surface) and/or at or proximate the vertical central axis of revolution, may reach a speed which is $\geq 0.1$ m/s, $\geq 0.2$ m/s, $\geq 0.3$ m/s or $\geq 0.5$ m/s and/or which is $\leq 2.5$ m/s, $\leq 2$ m/s, $\leq 1.8$ m/s or $\leq 1.5$ m/s.

The generation of such a toroidal flow pattern ensures highly efficient mixing and homogenizes the melt in terms of temperature profile and composition. Furthermore, the flow pattern of the invention favors the absorption of raw material into the melt, thus improving heat transfer to fresh raw material and reducing required residence time in the melter prior to withdrawal for further forming, while avoiding or at least reducing the risk of raw material short cutting the melt circulation.

According to another aspect, the present invention provides a melter assembly for melting material, notably vitrifiable raw batch material, which comprises a melting chamber equipped with at least five submerged combustion burners, each having a central burner axis projecting from its outlet, a raw material feeder and a melt outlet near the bottom of the melting chamber, the submerged combustion burners being arranged in a substantially annular burner zone, at the bottom of the said melting chamber, at a distance between adjacent burners and controlled in such a way that simulation by means of Computational Fluid Dynamics analysis shows a substantially toroidal melt flow pattern generated in the melt, with the central axis of revolution of the toroid being substantially vertical, comprising major centrally inwardly convergent flow vectors at the melt surface, and the central burner axis of the relevant burners being arranged at an angle of less than 30° from vertical.

According to one embodiment, each central burner axis is inclined by a swirl angle with respect to a vertical plane passing through a central vertical axis of melter and the burner center. The swirl angle may be $\geq 1°$, $\geq 2°$, $\geq 3°$, $\geq 5°$ and/or $\leq 30°$, $\leq 20°$, $\leq 15°$ or $\leq 10°$. Preferably, the swirl angle of each burner is about the same. Arrangement of each burner axis at a swirl angle imparts a slightly tangential speed component to the upward blowing flames, thus imparting a swirling movement to the melt, in addition to the toroidal flow pattern. The obtained melt flow pattern further improves the mix of raw material into the melt and the homogeneity of the melt. Preferably, the central burner axis of the relevant burners is arranged at a swirl angle of less than 15°, more preferably less than 10°.

In one preferred embodiment, the functional burners are arranged on a substantially circular burner line.

As mentioned above, the flow vectors preferably change orientation showing downwardly direction in proximity of the central vertical axis of revolution passing through the center of the substantially circular burner zone, hence reflecting significant downward movement of the melt in proximity of the said axis. At the bottom of the melting chamber, the flow vectors preferably change orientation showing an outwardly direction to the burner zone and then upwards direction at proximity of the said burners, reflecting recirculation of melt toward the burner zone and in an ascending movement back to the melt surface, thus defining an substantially toroidal flow pattern.

Generation of a toroidal melt flow pattern in which melt is ascending substantially over or adjacent to the relevant burners and converging inwardly towards the center of the said circular burner zone at the melt surface and downwardly in the center favors homogeneity of the melt in terms of temperature profile and composition. The distance between burners may vary as a function of burner design, operating pressure, viscosity of melt and other parameters. It should be noted however that too a small distance between burners may lead to fusion of flames, a phenomenon that should preferably be avoided.

Any two, any preferably all, adjacent burners may be arranged at a distance of about 250 to 1250 mm, advantageously about 500-900 mm, preferably about 600-800, even more preferably about 650-750 mm.

According to a preferred embodiment, the burners are arranged at a suitable distance of about 250-750 mm from the side wall of said melting chamber; this favors the flow described above and avoids flame attraction to the melting chamber side walls. Too small a distance between burners and side wall may damage or unnecessarily stress the side wall. While a certain melt flow between burner and wall may not harm or may even be desirable, in order to avoid buildup of too large a layer of solidified material on the walls, too large a distance will generate undesirable melt flows and may be the cause for dead zones which mix less with the melt in the center of the melter and hence lead to reduced homogeneity of the melt.

The distance between submerged burners is advantageously chosen such as to ensure the desired toroidal flow pattern within the melt but also to avoid that adjacent flames merge and opposite flames diverge. While this phenomenon depends on many parameters such as temperature and viscosity of the melt, pressure and other characteristics of the burners, it has been found advantageous to select a burner circle diameter comprised between about 1200 and 2000 mm. Depending on burner type, operating pressure and other parameters, too large a diameter may lead to diverging flames; too narrow a diameter may lead to merging flames.

According to a preferred embodiment, at least 6 burners are arranged on the burner circle line, preferably 6 to 10 burners, more preferably 6 to 8 burners, depending on the melter dimensions, burner dimensions, operating pressure and other design parameters.

Particularly in the case of a glass melter, each burner is preferably supplied with a combustible gas, notably comprising hydrocarbon(s), for example natural gas, and an oxygen containing gas, notably oxygen, technical grade oxygen (for example gas having an oxygen content of at least 95% by weight) or oxygen enriched air. Preferably, the combustible gas and the oxygen containing gas are supplied separately to the burner and combined at the burner and/or at nozzle(s) of the burner. Alternatively, other fuel types, for example liquid fuel or solid pulverized fuels, may be used, notably for waste vitrification.

For the sake of clarity, by toroidal flow pattern it is meant that the speed vectors of the moving fluid material, generated by simulation by means of Computational Fluid Dynamics analysis form a circulation pattern in which they fill cross-sections of a toroid which has as its central axis of revolution the vertical axis passing through the center of the substantially circular burner zone and as outer diameter approximately the outer diameter of said circular burner zone, with material flowing from the outside to the center at the melt surface.

Such toroidal flow entrains fresh raw material centrally and deeply into the glass melt and improves the efficiency in transmitting heat to the fresh raw material in order to melt it quickly and easily and further enhance homogeneity of the melt.

The solid raw material may advantageously be fed at above the melt surface. Preferably, the raw material is loaded continuously or substantially continuously into the melter thought batch loading is also possible.

The melter assembly may allow for individual control of each burner or individual control of each of a plurality of groups of burners, such as opposed burners. Burner(s) close to a raw material discharge may be controlled at different, preferably higher gas speeds and/or pressures than adjacent burners, thus allowing for improved heat transfer to the fresh raw material that is being loaded into the melter. Higher gas speeds may be required only temporarily, that is, in the case of batch wise loading of fresh raw batch material, just during the time period required for absorption of the relevant load into the melt contained in the melter of the invention.

It may also be desirable to control burners that are located close to a melt outlet at an adapted, advantageously lower gas speed/pressure in order not to disturb the outlet of the melt.

The melting chamber is preferably substantially cylindrical; other possible shapes include an elliptical cross section or polygonal cross section showing more than 4 sides, preferably more than 5 sides, the essence being that the arrangement allows for the generation of the toroidal melt flow as simulated in a computer making use of common fluid dynamics equations, as described above. It should be born in mind also that the distance between submerged burner and side wall as referred to above preferably is respected at least for the majority of the burners. The more uniform the distances are between burners and side wall, the more uniform the toroidal melt flow will be.

The height of a melt pool within the melter, especially when the melting chamber is substantially cylindrical, preferably with an internal diameter of the melting chamber of 1.5 m to 3 m, more preferably 1.75 to 2.5 m, may be:
≥about 0.75 m, ≥about 0.8 m, ≥about 0.85 m or ≥about 0.9 m; and/or
≤about 2.2 m, ≤about 2 m, ≤about 1.8 m, or ≤about 1.6 m.

The raw batch material may be loaded in to the melter through an opening in the melter wall above the melt surface. Said opening is advantageously closeable, for example by a piston, to reduce escape of heat and fumes. Raw material may be prepared as appropriate for the relevant melt to be obtained and charged into an intermediate chute. When the opening in the melter wall is opened, the material falls into the furnace, in opposite direction to the escaping fumes, is thus preheated and falls onto the melt surface. A raw material batch may be of 20 to 50 kg, depending on the size and production rate of the melter. The frequency of batch loading also will depend on these parameters, being of the order of 20-50 kg/min for a melter producing up to about 70000 kg/day. For reasons of process control including temperature control and homogeneity of melt, it is preferred to feed small batches at higher frequency, hence coming close to a continuous feed, rather than feeding large batches at reduced frequency.

Melt may be withdrawn continuously or batch wise, for example laterally, at or towards the bottom of the melter. In the case the raw batch material is loaded close to the melter wall, the melt outlet is preferably arranged opposite the raw material inlet. In the case of discontinuous discharge of melt, opening and closure of the discharge hole may be controlled, for example by a ceramic piston.

The submerged burners preferably inject high pressure jets of the combustion products into the melt sufficient to overcome the liquid pressure and to create forced upward travel of the flame and combustion products. The speed of the combustion and/or combustible gases, notably at the exit from the burner nozzle(s), may be ≥60 m/s, ≥100 m/s or ≥120 m/s and/or ≤350 m/s, ≤330 m/s, ≤300 or ≤200 m/s. Preferably the speed of the combustion gases is in the range of about 60 to 300 m/s, preferably 100 to 200, more preferably 110 to 160 m/s.

The temperature of the melt may be between 1100° C. and 1600° C. or 1650° C.; it may be at least 1200° C. or 1250° C. and/or at most 1500° C. or 1450° C. depending on the composition of the batch material and on the desired viscosity of the melt. According to a preferred embodiment, the melting chamber walls comprises double steel walls separated by circulating cooling liquid. Particularly in the case of a cylindrical melting chamber, such assembly is relatively easy to build and is capable of resisting high mechanical stresses. A cylindrical shape of the melter facilitates balance of stress on the outside wall. As the walls are cooled, preferably water cooled, melt solidifies and forms a protective layer on the inside of the melter wall. Preferably, the melter assembly does not require any internal refractory lining and therefore needs less or less costly maintenance. In addition, the melt is not contaminated with any undesirable components of refractory material eroded from the internal refractory lining. In the case of a glass melt for instance, glass solidifies on the cooled wall and forms an insulating layer or boundary layer; glass is thus melted in glass and the melt is not contaminated with erosion residues of any refractory material. The internal face of the melter wall may advantageously be equipped with tabs or pastilles or other small elements projecting towards the inside of the furnace. These may help constituting and fixing a layer of solidified melt on the internal melter wall which generates a thermal resistance and reduces the transfer of heat to the cooling liquid in the double walls of the melter.

The melter may be equipped with heat recovery equipment; hot fumes from the melter may be used to preheat raw batch material or the thermal energy contained in them may be extracted and/or used for other purposes in upstream or downstream equipment of a production line, e.g. a production line for insulating fiber products. Similarly, the thermal energy contained in the cooling liquid circulating between the two walls of the melter may be recovered.

The melter may be adapted and/or configured to sinter and/or melt raw materials. It may be a "glass melter", that is to say a melter adapted and/or configured to melt glass-like materials including materials selected from glass, vitreous materials, stone and rock. A glass melter may be used to manufacture flat glass, hollow glass, glass fibers, continuous fibers for reinforcement purposes, mineral fibers for insulation purposes, mineral wool, stone wool or glass wool. The melter may be used to transform raw materials to manufacture frits, cement clinker, notably alumina cement clinker, or abrasives, notably abrasives produced by melting. The melter may be used to transform raw materials, notably by vitrification, for example: vitrificatio of medical wastes; vitrification of ash, notably from incinerators; vitrification of powders, for example dusts from cast iron or other metal foundries; vitrification of galvanic sludge, tannery sludge or mining industry waste; disposal of waste, notably by vitrification, for example, of polluted soil, soil polluted by heavy metals or tar, clay filters, sludge, activated carbon, radioactive waste, slags containing lead or zinc, refractories, notably refractories containing chromium. Particularly in the case of a glass melter, the raw materials may comprise: silicates, basalt, limestone, soda ash, zeolite catalyst, spent catalyst, spent pot liner, refractory materials, aluminum dross, aluminium melting scum, sand based fire extinguisher waste, sludge, galvanic sludge, clinker, waste materials, ash and combinations thereof.

The disclosed method and melter are particularly suitable to melt all sorts of vitrifiable material in an efficient way, with reduced energy consumption and at reduced maintenance costs. A melter as per the invention is thus particularly attractive for use in a production line for mineral fiber products, for example glass fibers, glass wool and stone wool manufacturing. Particularly in the case of mineral wool fiber production, the output is preferably taken directly to fiberization without a refining step In the case of a glass melt, the composition of the melt produced may comprise one or more of:

|  | Possible melt composition (% weight) | Preferred melt composition (% weight) |
|---|---|---|
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| $K_2O$ | 0-15 | 0-10 |
| $Fe_2O_3$ (total iron) | 0-15 | 0.5-10 |
| $B_2O_3$ | 0-10 | 0-5 |
| $TiO_2$ | 0-5 | 0-2 |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| $SiO_2 + Al_2O_3$ | 50-85 | 60-80 |

The boron content of glass produced, expressed as B2O3, may be ≥1 w %, ≥2 w %, ≥3 w %, ≥5 w % and/or ≤20%, ≤18%, ≤15% or ≤10 w %.

An embodiment of the present invention will be described in more details below, with reference to the appended drawings of which.

Figure 1A:
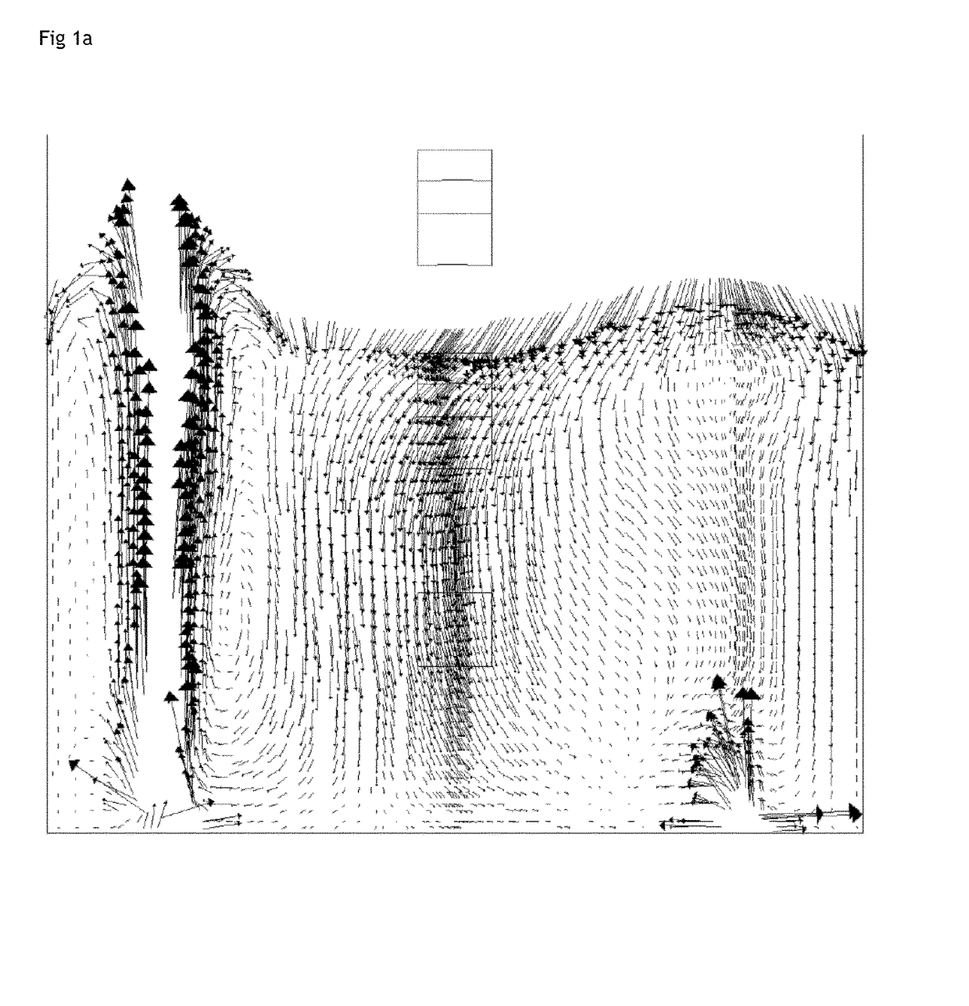
FIGS. 1a and 1b are representations of a toroidal flow pattern generated by computer simulation in accordance with the present invention.
Figure 1B:
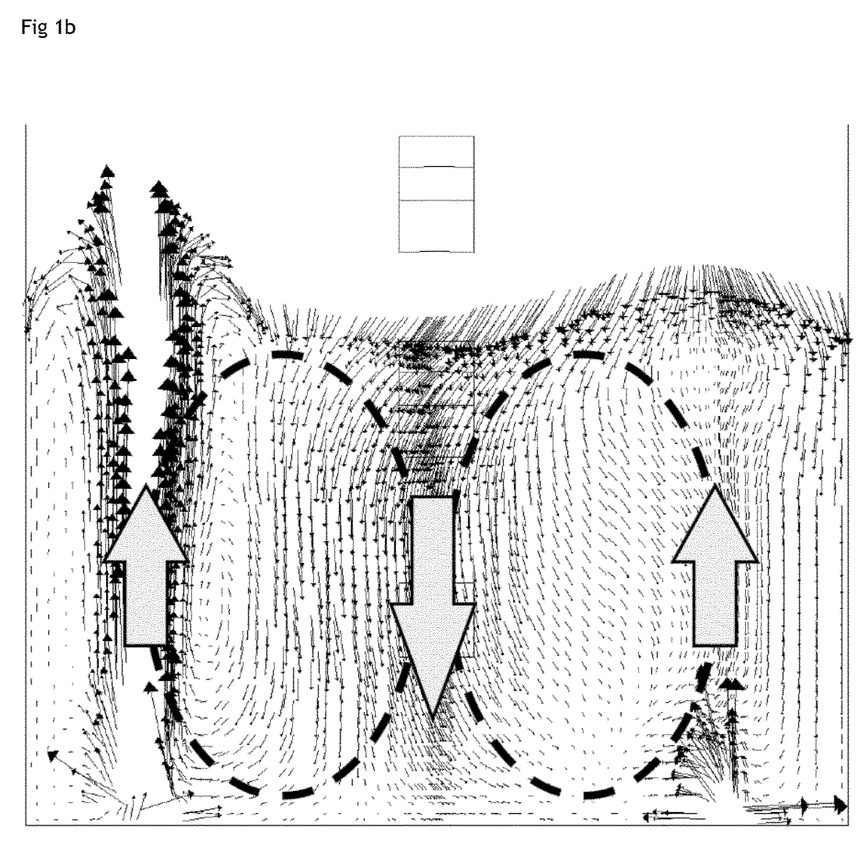

A toroidal flow pattern in a glass melter is illustrated in FIGS. 1a and 1b. Melt follows an ascending direction close to submerged burners arranged on a substantially circular burner line, flows inwardly towards the center of the relevant circle line, at the melt surface, and then downwards again, in proximity of the said center. Such toroidal flow ensures good stirring of the melt and absorption of fresh raw material.

As will be seen later below, additional flow circulations may take place. Melt may flow between burners and side wall. Other flows may take place between burners. These are not necessarily disadvantageous and, to the contrary, may even be desirable.

The toroidal flow pattern has been generated by computer simulation, taking into consideration common Eulerian, multi-phase fluid dynamics modeling techniques familiar to those skilled in the art. The computational fluid dynamics code selected for this exercise advantageously is ANSYS R14.5. The model advantageously takes into consideration the multi-phase flow field spanning the full range of mixture fractions from dispersed gas bubbles in liquid to distributed solid particles or liquid droplets in gas, with the solid phase batch undergoing a multi-phase, thermo-chemical conversion reaction to produce liquid phase melt and gas phase species. The system utilizes submerged combustion of fuel and oxygen gas phase species to produce carbon dioxide and water vapor. In addition, the melt viscosity is highly temperature dependent. The complex batch-to-melt conversion process may be modeled with the reaction step following an Arrhenius rate law $$Batch_{solid} + \Delta H_r \rightarrow Melt_{liquid} + 0.074 CO_2 + 0.093 H_2O$$

with Arrhenius reaction rate  $k = AT^2 e^{(-E/T)}$ the Arrhenius rate constants being taken from the literature (see A Ungan and R Viskanta, "Melting behavior of continuously charged loose batch blankets in glass melting furnaces", Glastech. Ber. 59 (1986) Nr. 10, p. 279-291). The molar ratios of the batch gases in this reaction are consistent with the production of 0.0503 kg $CO_2$ and 0.0258 kg $H_2O$ from 1 kg batch. The heat of reaction accounts for all energy required to convert batch into liquid phase melt and gas species, including both chemical conversion and phase change heat requirements. Physical properties for the batch and melt may be taken from literature as far as available and/or may be determined by methods known per se. Radiation heat exchange is simulated using the Discrete Ordinates Radiation model, with the gas phase absorption coefficient estimated using the Weighted Sum of the Gray Gases model, the melt absorption coefficient specified (to a high value of 300 l/m) and the batch absorption coefficient advantageously specified so as to render it opaque relative to the other fluids. While the melt is assigned as the primary fluid phase and the gases are assigned as the secondary fluid phase having uniform bubbled diameter of 5 mm. Momentum exchange among the liquid and gas phases above the anticipated bath height is artificially suppressed.

Figure 2:
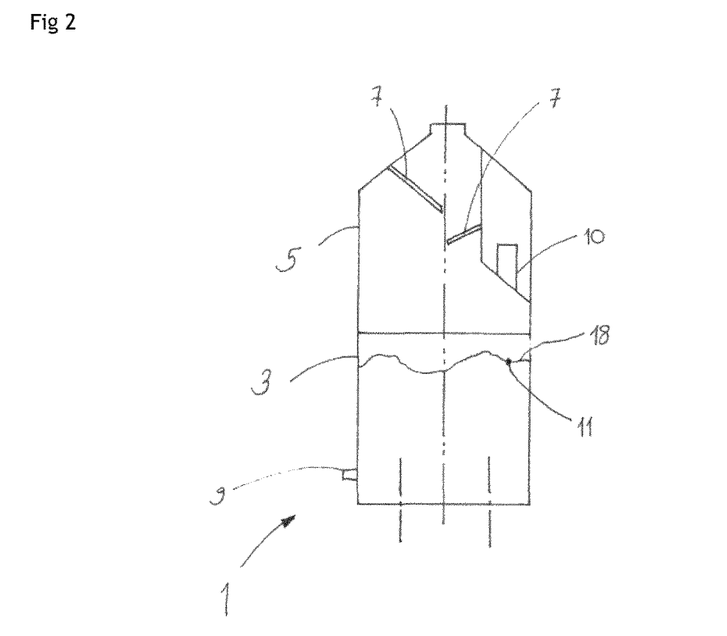
FIG. 2 is a vertical section through a melter.
Figure 3:
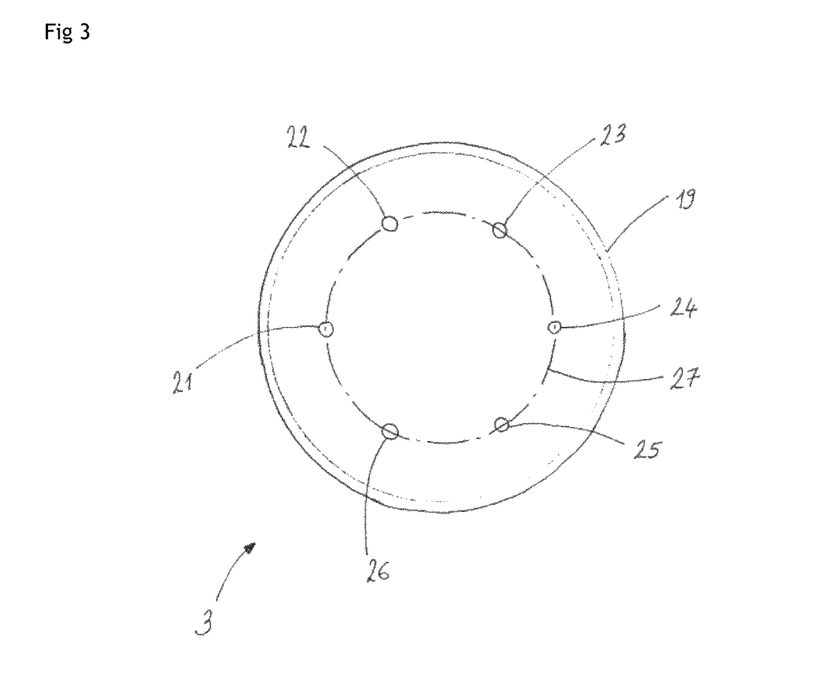
FIG. 3 is a schematic representation of a burner layout.

The illustrated melter 1 comprises a cylindrical melting chamber 3 having a diameter of about 2.0 m which contains the melt and extends into an upper chamber 5 and then into the chimney for evacuation of the fumes. The upper chamber 5 is equipped with baffles 7 that prevent any melt projections being entrained into the fumes. A raw material feeder 10 is arranged at the level of the upper chamber 5 and is designed to load fresh raw material into the melter 1 at a point 11 located above the melt surface and close to the side wall of the melter. The feeder 10 comprises a horizontal feeding means, for example a screw feeder, which transports the raw material mix to a hopper fastened to the furnace, the bottom of which may be opened by a vertical piston as required by the control of the melter operation. The bottom of the melting chamber comprises submerged burners arranged on a circular burner line concentric with the burner axis and having a diameter of about 1.4 m. The burner layout is schematically represented in FIG. 3. For the sake of clarity, the design represented in the figures has a preferred layout with six submerged burners distributed around the burner line. Different layouts are possible depending on the dimensions of the melter, the viscosity of the melt and the characteristics of the burners. It is essential though that the arrangement generates the toroidal melt flow as defined above. The melt may be withdrawn from the melting chamber through a controllable outlet opening 9 located in the melting chamber side wall, close to the melter bottom, substantially opposite the feeding device 10.

The temperature within the melt may be comprised between 1100° C. and 1600° C. or 1650° C., or 1200° C. and 1500° C., or 1200° C. and 1450° C., preferably 1250° C. and 1400° C., depending on the composition of the melt, desired viscosity and other parameters. According to a preferred embodiment, the melter wall is a double steel wall cooled by a cooling liquid, preferably water. Cooling water connections are provided for on the external wall. Such connections are known per se and should be calculated to allow a flow sufficient to withdraw energy from the inside wall such that melt can solidify on the internal wall at about 150° C. and the cooling liquid, here water, does not boil.

The melter represented in the figures is advantageously substantially cylindrical. Submerged combustion generates high stress components that act on the melter walls and the melter is subjected to heavy vibrations. These may be significantly reduced in the case of a cylindrical melting chamber. If so desired, the melter may further be mounted on dampers which are designed to absorb most of the vibrational movements.

The submerged burners may comprise concentric tube burners (also known as tube in tube burners) operated at gas flow or speed in the melt of 100 to 200 m/s, preferably 110 to 160 m/s. The burners preferably are designed such as to generate combustion of fuel gas and air and/or oxygen within the melt. The combustion and combustion gases generate high mixing within the melt before they escape into the upper chamber and then through the chimney. These hot gases may be used to preheat the raw material and/or the fuel gas and/or oxidant (air and/or oxygen) used in the burners. The fumes generally are filtered prior to release to the environment. Where filtering needs to occur at reduced temperatures, prior dilution of fumes with cooler ambient air may be used.

The burners generate an ascending movement of melt in their proximity and a circulation within the melt. The arrangement of the burners on a circular burner line, at the bottom of the melting chamber, generates a toroidal movement as explained above and as desired in accordance with the invention. The skilled person will need to adapt the distance between burners and between burner and wall, for given burner designs, such as to avoid the burner flames fuse or are attracted to the wall or otherwise diverted from the central burner axis.

The melter of the invention may also be equipped with an auxiliary burner which may be exploited in case of preheating the melter when starting or in case of malfunction of one at least of the submerged burners or in other cases additional heat is temporarily required. In one configuration, an auxiliary burner is mounted on a rail so that it can be guided through a closeable aperture provided in the melter wall.

A melter according to the invention is particularly advantageous in a glass fiber, glass wool or stone wool production line because it is particularly efficient leading to reduced energy consumption and flexible which allows for easy changes of raw material composition. Ease of maintenance and low production costs of said melter are also of major interest in building such a production line.

For computational fluid dynamics modeling of the melter described above (see flow pattern shown in FIG. 1), a batch inlet of 0.833 kg/s at inlet temperature of 27° C. was set in the model, consistent with a 72 T/day production rate. Burner inlet was set as follows: firing rate=5.2 WM (based on LHV); mass flow rate of 0.109 kg/s per burner; molar composition=0.11 $C_3H_8$, 0.89 $O_2$; inlet temperature of 15° C. The walls were modeled by specifying a uniform surface temperature of 152° C. behind a thickness of solidified glass which serves as an insulator. The thermal conductivity specified for the glass is 1 W/mK. The glass thickness, nominally 15 mm, is varied to achieve an average heat flux of from 50 to 70 $kW/m^2$.

The invention claimed is:

1. A process of providing a molten material comprising introducing solid batch material into a melter, and melting the solid batch material in the melter by submerged combustion to afford a melt, and subjecting the melt to a flow pattern which when simulated by means of Computational Fluid Dynamics analysis shows a substantially toroidal melt flow pattern generated in the melt in the melter, comprising major centrally inwardly convergent flow vectors at the melt surface followed by downward oriented flow in proximity of the central axis of revolution of the toroidal melt flow pattern, with the central axis of revolution of the toroidal melt flow pattern being substantially vertical.

2. The process of claim 1 in which, at the melter bottom, the flow vectors change orientation showing orientation(s) which are outward and then upwards again.

3. The process of claim 1 in which the computational fluid dynamics model takes into consideration the multi-phase flow field with phases ranging from solid batch material to liquid melt, to various gas species associated with both the combustion of fuel and oxidant by the burners as well as those generated in the course of the batch-to-melt conversion process.

4. The process of claim 1 in which the melt is withdrawn for further downstream processing, including flat glass or container glass formation, continuous fiber formation or mineral wool fiber production.

5. The process of claim 1 in which the toroidal melt flow pattern is obtained by arrangement of submerged combustion burners at the melter bottom, in a substantially annular burner zone, imparting a substantially vertically upward directed speed component to the flame and combustion gases, at a distance between adjacent burners of about 250 to 1250 mm.

6. The process of claim 5 wherein the distance between adjacent burners is about 600 to 800 mm.

7. The process of claim 1 in which the inwardly convergent flow vectors at the melt surface show a speed up to approximately 2 m/s.

8. The process of claim 1 in which the downward oriented speed vectors at proximity of the vertical central axis of revolution show a downward speed component up to 2 m/s.

9. The process of claim 1 in which a tangential speed component is imparted to the upwards blowing combustion gases.

10. The process of claim 1 wherein the toroidal melt flow pattern is obtained by arrangement of the submerged combustion burners at the melter bottom, in a substantially annular burner zone, imparting a substantially vertically upward directed speed component to the flame and combustion gases.

11. The process of claim 10 wherein the central axis of revolution passes through the center of the substantially annular burner zone.

12. A melter assembly for melting solid raw batch material to afford a melt, which comprises a melting chamber equipped with at least six submerged combustion burners, each having a central burner axis projecting from its outlet, a raw material feeder and a melt outlet near the bottom of the melting chamber, the submerged combustion burners being arranged in a substantially annular burner zone, at the bottom of the melting chamber, at a distance among adjacent burners and controlled such that computer simulation making use of common fluid dynamics equations shows a substantially toroidal melt flow pattern generated in the melt, with the central axis of revolution of the toroidal melt flow pattern being substantially vertical, comprising major centrally inwardly convergent flow vector components at the melt surface followed by downward oriented flow in proximity of the central axis of revolution of the toroidal melt flow pattern, and the central burner axis of the burners being arranged at an angle of less than 30° from vertical.

13. The melter assembly of claim 12 in which the submerged combustion burners are arranged on a substantially annular burner line, through the bottom of said melting chamber.

14. The melter assembly of claim 13 in which a burner circle diameter is comprised between about 1200 and 2000 mm.

15. The melter assembly of claim 13 in which 6 to 10 burners are arranged on a burner circle line.

16. The melter assembly of claim 12 in which the submerged combustion burners are arranged at a distance between adjacent burners of about 250-1250mm.

17. The melter assembly of claim 12 in which the burner axis is inclined by less than 30° from vertical such as to impart a tangential speed component to the combustion gases.

18. The melter assembly of claim 12 in which the burners are arranged at a distance of about 250-750 mm from the side wall of said melting chamber.

19. The melter assembly of claim 12 in which the raw material is fed above the melt surface.

20. The melter assembly of claim 12 in which the burners or a group of burners are controlled individually.

21. The melter assembly of claim 12 in which the melting chamber is substantially cylindrical, or shows an elliptical cross section or polygonal cross section showing more than 5 sides.

22. The melter assembly of claim 12 in which the melter comprises a hole in the melter wall, above the melt surface, capable of being opened and closed by means of a piston or equivalent means.

23. The melter assembly of claim 12 in which a melt discharge hole is arranged opposite the raw material inlet, in the peripheral melter wall, near the bottom of the melting chamber and in that the discharge hole is controlled by means known per se.

24. The melter assembly of claim 12 in which the submerged burners inject high pressure jets of the combustion products into the melt, at a velocity of the combustion gases in the range of about 60 to 300 m/s.

25. The melter assembly of claim 12 in which the melting chamber walls comprise double steel walls separated by circulating cooling liquid.

26. The melter assembly of claim 12 in which the melter is equipped with heat recovery equipment.

27. A production line for glass fibers, glass wool or stone wool comprising the melter assembly of claim 12.

28. The melter assembly of claim 12 in which the submerged combustion burners are arranged at a distance between adjacent burners of about 500-900 mm.

29. A process of providing a molten material comprising introducing solid batch material into a melter, and melting the solid batch material in the melter by submerged combustion to afford a melt, and subjecting the melt to a flow pattern which when simulated by means of Computational Fluid Dynamics analysis shows a substantially toroidal melt flow pattern generated in the melt in the melter by at least 5 submerged combustion burners arranged such as to provide a single substantially toroidal melt flow pattern comprising major centrally inwardly convergent flow vectors at the melt surface, with the central axis of revolution of the toroidal melt flow pattern being substantially vertical.

\* \* \* \* \*